United States Patent [19]

Ross

[11] Patent Number: 5,039,060
[45] Date of Patent: Aug. 13, 1991

[54] CONTROL VALVE VIBRATION DAMPER/ISOLATOR

[75] Inventor: Joseph W. Ross, Huntsville, Ala.
[73] Assignee: Westinghouse Electric Corp., Pittsburgh, Pa.
[21] Appl. No.: 473,501
[22] Filed: Feb. 1, 1990
[51] Int. Cl.$^5$ ............................................. F16K 31/72
[52] U.S. Cl. .............................. 251/64; 277/148; 277/149; 277/151; 277/160; 277/215; 277/DIG. 9
[58] Field of Search ............ 251/64, 297; 137/514, 137/514.5; 277/97, 148, 149, 150, 151, 160, 174, 192, 215, DIG. 9

[56] References Cited

U.S. PATENT DOCUMENTS

| | | | |
|---|---|---|---|
| 2,719,767 | 10/1955 | Ernest | 277/160 X |
| 3,161,400 | 12/1964 | Floyd | 251/297 X |
| 3,913,885 | 10/1975 | Greenwood et al. | 251/64 X |
| 4,383,546 | 5/1983 | Walters, Jr. | 277/160 X |
| 4,384,554 | 5/1983 | Gotada | 277/160 X |

Primary Examiner—John Rivell
Attorney, Agent, or Firm—K. Bach

[57] ABSTRACT

A damper/isolator device having four ring segments (38) which are retained in slots (36) in an upper guide (31). The four segments (38) are forced radially outward against a valve bonnet liner (30) and are retained and centered within the slot (36) by serpentine or buggy type springs (44). The natural frequency of the damper and spring system is designed to be significantly higher than the frequency of the applied vibration induced by steam flow across a valve seat. This provides for the isolation of the valve plug (13) from the liner (30) and bonnet bore (11). The surface interaction between the ring segments (38) and the upper guide (31) provides for added friction damping to the system.

17 Claims, 2 Drawing Sheets

CONTROL VALVE VIBRATION DAMPER/ISOLATOR

BACKGROUND OF THE INVENTION

The present invention relates to a vibration damper/isolator for a control valve, such as a steam control valve.

Control valves for controlling the flow of fluids are well known in the art. In a nuclear power generating system, control valves are employed for controlling the flow of fluids, such as steam. Past nuclear control valves have experienced significant problems due to the severe conditions in which they are operated.

Steam control valves in nuclear power generating facilities are generally relatively large in comparison to steam control valves used in other power generating facilities, e.g., fossil fuel facilities. The use of larger valves in nuclear power facilities is due, in part, to the generally lower energy steam produced by nuclear facilities as compared to fossil fuel facilities. These larger valve structures tend to exhibit problems which may not be as significant in smaller valve structures. For example, typical steam control valves used in power facilities must be operable to close a steam path within a short period of time. Thus, the valve plug employed in such valves must be able to move to a position which blocks or closes the steam path at a high speed. In order to ensure quick movements of the relatively large valve plug assembly employed in most nuclear control valves, the valve plug should not be so tightly fit within a valve bonnet that movement of the valve plug along the axis of the bonnet would be significantly restricted or slowed. However, past valve designs include a valve plug which is so loosely fit within the valve bonnet that the valve plug tended to vibrate laterally with respect to the valve bonnet.

Thus, a common problem which such past nuclear steam control valves have experienced is significant vibrations of the operating parts of the valves. These vibrations are generally high frequency vibrations induced by a fluid flow, e.g., steam flow, across the valve seat. The frequencies of vibrations induced by steam flow generally occur across a broad spectrum of the audio frequency range. For example, such frequencies as K°85 Hz, where K=0, 1, 2 . . . , have been noted. A large portion of the noted vibration energy tends to occur in the 300–400 Hz range.

Such vibrations can cause severe wear and damage to the internal valve components. For example, cracks in valve components, including housings and mufflers, and excessive wear to valve liners, seal ring slots, valve stems and valve stem bushings have been attributed to such vibrations. Additionally, such vibrations have been known to cause damage to external operating systems mounted on or with valve bonnets. Moreover, such vibrations have been known to cause excessive noise transmissions into the turbine room floor area of nuclear facilities.

SUMMARY OF THE INVENTION

It is an object of the present invention to provide a damper/isolator device which, when incorporated in a nuclear control valve, will reduce the vibration experienced by the valve during operation.

It is further an object of the present invention to provide a damper/isolator device which, when incorporated in a control valve, will reduce or prevent the transmission of vibrations from the valve plug to the bonnet liner bore of the valve during operation.

It is further an object of the present invention to provide a damper/isolator device which, when incorporated in a control valve, will centralize the valve plug with respect to the valve bonnet bore.

It is further an object of the present invention to provide a damper/isolator device which, when incorporated in a control valve, will reduce excessive noise.

It is further an object of the present invention to provide a damper/isolator device which, when incorporated in a control valve, will reduce overall internal valve plug/ring wear and damage.

These and other objects are accomplished according to the present invention by providing a control valve having a housing and a valve plug movable within the housing, a vibration control device comprising:

a movable abutting device extending from the valve plug, movable with respect to the valve plug, and abutting the housing; and a resilient device disposed between the movable abutting device and the valve plug.

Preferably, the damper/isolator device has a plurality of ring segments retained in slots of an upper guide. The ring segments are forced radially outward against a valve bonnet liner and are retained and centered within the slot by serpentine or buggy type springs. The surface interaction between the plural ring segments and the upper guide provides added friction damping to the system. The natural frequency of the damper-spring system is designed to be significantly lower than the high frequency vibration induced by fluid flow across the valve seat. Accordingly, the valve plug can be isolated from vibrations in the liner/bonnet bore by the damper system.

BRIEF DESCRIPTION OF THE DRAWINGS

The detailed description of &:he invention will be made with reference to the accompanying drawings, wherein like numerals designate corresponding parts in the several figures.

DESCRIPTION OF THE PREFERRED EMBODIMENTS

The following detailed description is of the best presently contemplated mode of carrying out the invention. This description is not to be taken in a limiting sense, but is made merely for the purpose of illustrating the general principles of the invention. The scope of the invention is best defined by the appended claims.

In the following description, embodiments of the present invention are discussed in relation to and incorporated in a nuclear plant steam control valve, and in particular a steam control valve in a nuclear power generating facility. It will be recognized, however, that embodiments of the present invention can be employed in other types of valve arrangements.

Figures 1, 1A:
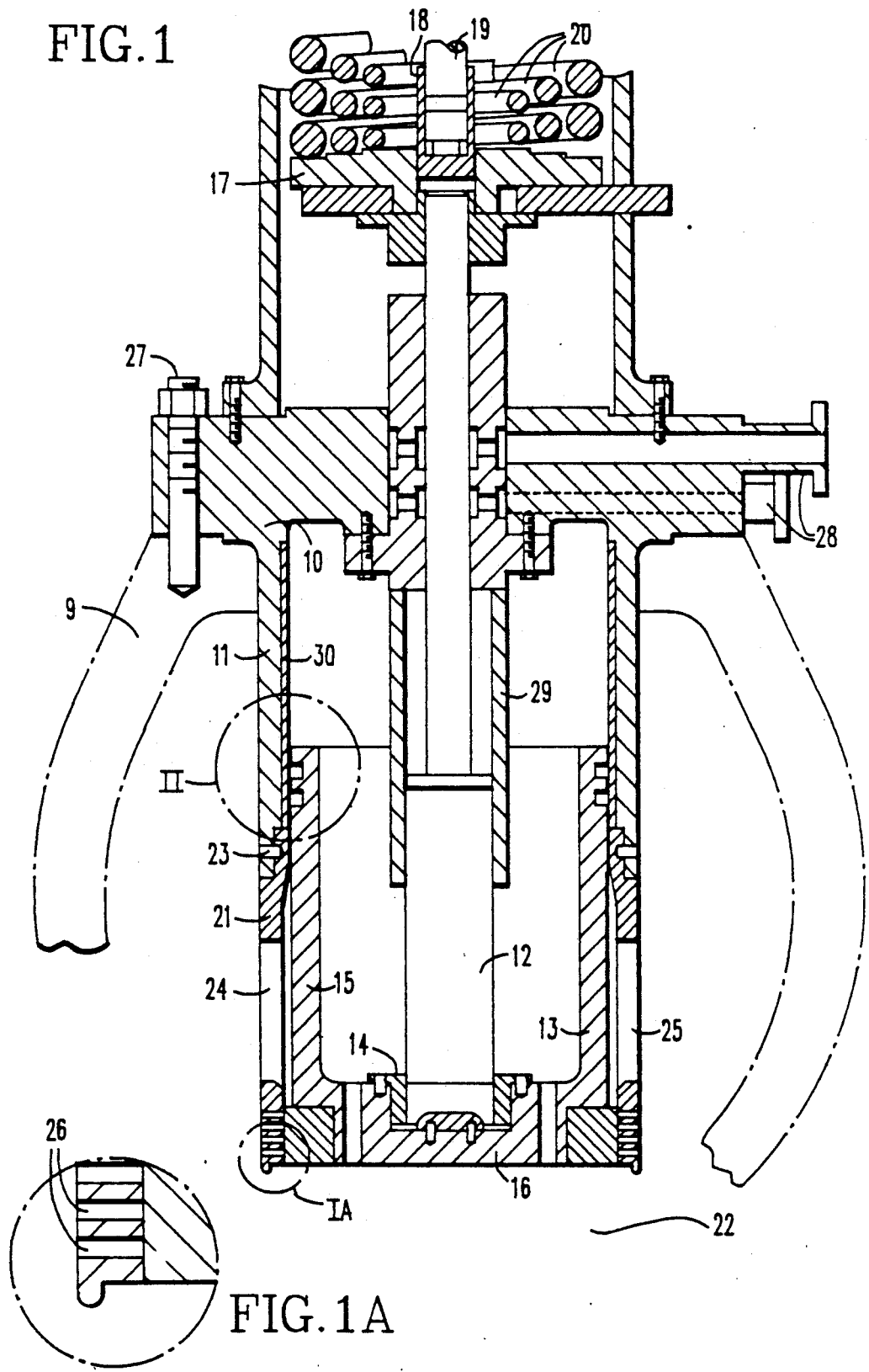
FIG. 1 is a cross-sectional view of a nuclear plant steam control valve with which an embodiment of the present invention is incorporated.

FIG. 1 represents a cross-sectional view of a portion of a control valve for controlling the flow of steam. The control valve includes a valve body 9 defining a steam flow path and having a bonnet generally indicated at 10. A portion 11 of the bonnet 10 has a substantially hollow cylindrical shape. A valve stem 12 is disposed within the substantially hollow bonnet portion 11 and extends along the central axis of the bonnet portion 11. Also disposed within the substantially hollow bonnet portion 11 is a valve plug 13. One end of the valve stem 12 (the end shown in the lower portion of FIG. 1) is secured with the valve plug 13 by a stem retainer 14.

The valve plug 13 shown in FIG. 1 has a substantially cylindrical wall 15 and a base portion 16. The substantially cylindrical wall 15 has an outside diameter which is preferably slightly less than the inside diameter of the substantially hollow cylindrical bonnet portion. In operation, the valve plug 13 is adapted to fit within the bonnet portion 11 with the outside surface of the wall 15 arranged adjacent to the inside surface of the substantially cylindrical bonnet portion.

As discussed above, the valve stem 12 is disposed within the bonnet portion 11 and is secured at one end with the valve plug 13. The valve stem 12 is movably secured within the bonnet portion 11 and is movable in the axial direction of the bonnet portion 11. In the FIG. 1 embodiment, the valve stem 12 is secured with a spring plate 17 and a coupler 18.

A hydraulic actuator stem 19 extends from a hydraulic actuator (not shown) and is secured with the coupler 18. The hydraulic actuator (not shown) operates in a well known manner to control the movement of the hydraulic stem 19 in the axial direction with respect to the bonnet portion 11. In this manner, the hydraulic actuator also controls the movement of the coupler 18, the spring plate 17, the valve stem 12, and the valve plug 13. Thus, with respect to FIG. 1, as the hydraulic actuator moves the stem 19 in the axial direction of the bonnet portion 11, the hydraulic actuator also moves the spring plate 17, the valve stem 12, and the valve plug 13 in the axial direction of the bonnet portion 11. In this manner, the hydraulic actuator can control the movement of the valve plug 13 within the bonnet portion 11 in the up or down direction, with respect to FIG. 1, to thereby open and close the valve, and thus control the flow of steam through valve body 9, as will be described below. Springs 20 abut the spring plate 17 and urge the spring plate 17 in one direction (the downward direction in FIG. 1) along the axis of the bonnet portion 11. As a result, the springs 20 urge the valve stem 12 and the valve plug 13 in one direction along the axis of the bonnet portion 11 to close the valve as will be discussed below.

Extending from the substantially cylindrical bonnet portion 11 is a substantially cylindrical muffler 21 provided with an exhaust area 22 and multiple apertures, two of which are shown at 24 and 25, respectively. The muffler 21 may be attached to the bonnet portion 11 by any suitable means, such as pins 23. In FIG. 1, the apertures 24 and 25 are blocked by the substantially cylindrical wall 15 of the valve plug 13. However, the apertures 24 and 25 may be opened so as to communicate fluid (e.g., steam) therethrough by moving the valve plug 13 in the axial direction of the bonnet portion 11. For example, by the action of the hydraulic actuator, the valve plug 13 can be moved in the upward direction, with respect to FIG. 1, to thereby provide a communication path between apertures 24 and 25 and the valve exhaust area 22. Additionally, by the action of the hydraulic actuator and/or by the urging force of the springs 20, the valve plug 13 can be moved in the downward direction, with respect to FIG. 1, to thereby block the fluid path between apertures 24 and 25 and the valve exhaust area 22. In this manner, a fluid flow, such as a steam flow, can be controlled to pass through the apertures 24 and 25 or to be blocked from passing through the apertures 24 and 25 by controlling the movement of the valve plug 13.

The muffler 21 also includes a plurality of apertures 26 extending through the substantially cylindrical wall of the muffler 21. The apertures 26 are significantly smaller in area than the apertures 24 and 25. As shown in FIG. 1, the apertures 26 are adapted to communicate fluid through the muffler 21 when the valve plug 15 is moved in one direction (upwards with respect to FIG. 1) along the central axis of the bonnet portion 11. Communication of fluid through the muffler apertures 26 may be selectively blocked by the base portion 16 of the valve plug 13 as shown in FIG. 1.

The bonnet portion 11 may be secured with the valve body 9 by any suitable securing means such as the bolt assembly 27. A bushing 29 is disposed about the valve stem 12, within the bonnet portion 11, to guide the valve stem. The bonnet portion 11 is provided with stem leakoff channels 28 which extend through the bonnet portion 11 from a location adjacent the valve stem 12. In this manner, steam which may pass between the bushing 29 and the valve stem 12 can be drained off through the stem leak-off channels 28.

The inside surface of the substantially hollow cylindrical bonnet portion 11 is provided with a bonnet liner 30 against which the valve plug 13 is movably sealed. A damper/isolator and sealing arrangement, according to an embodiment of the invention, for damping, isolating and sealing the valve plug 13, with respect to the liner 30, is generally shown within the circle marked 2 in FIG. 1 and is illustrated in greater detail in FIGS. 2 and 3.

Figure 2:
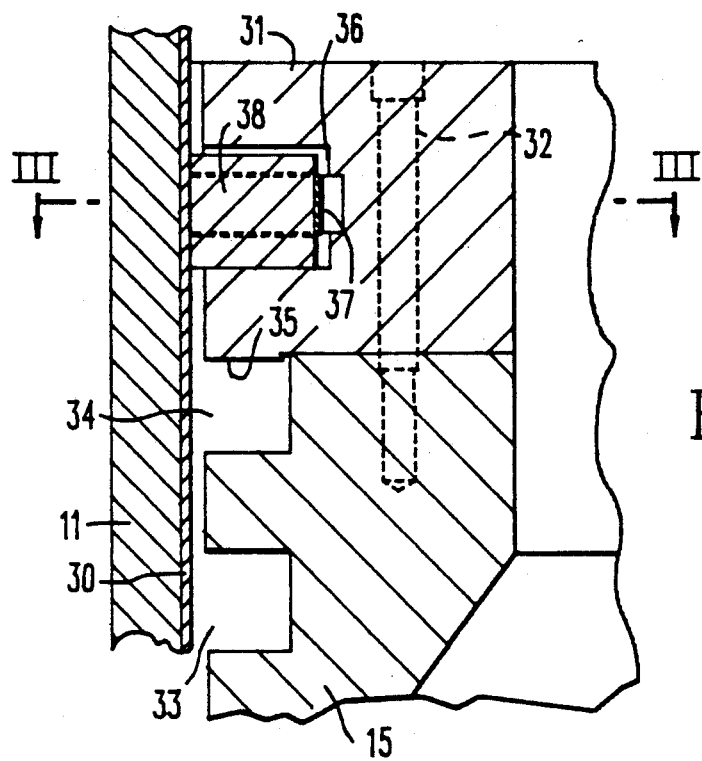
FIG. 2 is a detail view to an enlarged scale of the portion of FIG. 1 which is circled and labeled 2.

FIG. 2 shows a portion of the bonnet portion 11 and the liner 30 provided on the inside surface of the bonnet portion 11. Also shown in FIG. 2 is a portion of the substantially cylindrical wall 15 of the valve plug 13.

An upper guide member 31 is secured with the wall 15 by any suitable securing means, such as the screw or bolt assembly 32. The wall 15 is provided with a channel 33 facing the liner 30. The wall 15 is also provided with a stepped portion 34 also facing the liner 30. Upon securing the upper guide 31 with the wall 15, a surface 35 of the upper guide 31 extends adjacent the stepped portion 34 to form the stepped portion 34 into a channel. Preferably, the surface 35 extending adjacent the stepped portion 34 is case hardened. The channel 33 and the channel formed from the stepped portion 34 and the surface 35 provide receptacles in which suitable sealing devices, e.g., pressure seal rings or the like, may be disposed.

The upper guide 31 shown in the illustrated embodiment comprises a substantially ring shaped member having a substantially square cross-section. The upper guide 31 is provided with a plurality of circumferentially spaced channels 36 in its outer peripheral surface facing the liner 30. Preferably, the upper guide 31 is provided with four channels 36, each of which extends less than one-quarter of the distance around the outer circumferential surface of the upper guide 31. Also in the preferred arrangement, the channels 36 are arranged end to end and spaced from each other circumferentially at the channel ends to form a bifurcated ring about the upper guide 31.

Each slot 36 is provided with an additional slot 37 which extends radially and circumferentially, inwardly of the vertical walls of slot 36 into the upper guide 31 by a distance slightly greater than the distance which the slots 36 extend. The slots 37 are narrower in the vertical direction, than the associated slots 36. A function of slots 37 is to hold springs 44 as will be discussed below.

Figure 3:
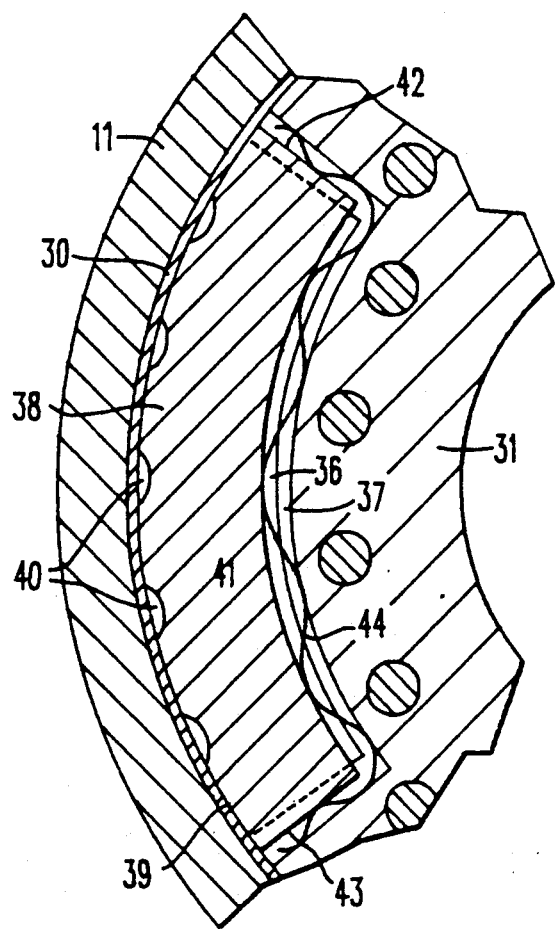
FIG. 3 is a detail plan cross-sectional view of the device shown in FIG. 2 taken along the line labeled 3—3 in FIG. 2.

As shown in FIGS. 2 and 3, a ring segment 38 is disposed within each slot 36. Each ring segment 38 is shaped to fit within a slot 36 but is too large to fit within a slot 37. Referring to FIG. 3, each ring segment 38 includes an outer circumferential surface 39 which faces and abuts the liner 30 during operation of the valve. The outer circumferential surface 39 is preferably provided with a plurality of scallops or indentations 40 for providing fluid flow paths and for assisting in equalizing the pressure across the ring segments. The outer circumferential surface 39 is arced so as to match the inner circumferential surface of the liner 30. Each ring segment 38 may be provided with an inner circumferential surface 41 which is arced as shown in FIG. 3. Each ring segment 38 is also provided with end surfaces 42 and 43 which face in the direction of end surfaces of adjacent ring segments.

In the embodiment shown in FIG. 3, each ring segment 38 is urged outward away from the upper guide 31 and toward the liner 30 by a serpentine or buggy type spring 44. Each spring 44 has a configuration adapted to fit within a slot 37. In this manner, each spring 44 abuts the upper guide 31 and a ring segment 38 and urges the ring segment 38 in the direction out of the slot 36.

As shown in FIG. 3, each slot 37 may extend from all three surfaces formed by the associated slot 36. In this arrangement, each spring 44 may extend around three sides of a ring segment 38 and may urge against surfaces 41, 42 and 43 of the ring segment 38. Each ring segment 38 can, therefore, be urged from three directions toward the liner 30 and can be tightly fit within a slot 36 and adjacent the liner 30.

With each ring segment 38 being urged toward the liner 30 as discussed above, the upper guide 31 and the valve plug 13 are snugly fit within the substantially hollow cylindrical bonnet portion 11. The forces exerted by the springs 44 to urge the four ring segments 38 against the liner tend to inhibit lateral movement of the valve plug 13 within the bonnet portion 11. Furthermore, by virtue of the damping pressure exerted on the liner 30 by the ring segment and spring assemblies discussed above, the valve plug 13 can be movable (in the axial direction of the bonnet portion 11) within the bonnet portion 11 and substantially resistent to unwanted vibrational movements (in the lateral direction of the bonnet portion 11) and the adverse effects caused by such vibrational movements.

The resilient mounting of segments 38 allows relatively free movement of plug 13 in the vertical direction so that plug 13 can undergo rapid opening and closing movements.

Additionally, the scallops or indentations 40 provided in the bonnet facing surface of the ring segments provide fluid paths across the ring segments. In this manner, the pressure on one side of the upper guide 31 (e.g., below the upper guide in FIG. 1) will not be significantly different from the pressure on the other side of the upper guide 31 (e.g., above the upper guide in FIG. 1). The inability to create a significant pressure difference across the upper guide is believed to reduce the occurrence of some unwanted vibrations; that is, it is believed that such a pressure difference contributes to unwanted vibrations.

The upper guide 31, ring segments 38 and springs 44 described above comprise an unique damper/isolator device, which, when incorporated into a steam control valve, will provide a variety of beneficial results. For example, the damper/isolator device operates to centralize the valve plug 13 with respect to the substantially hollow cylindrical bonnet portion 11. Since each ring segment is urged against the liner 30 with substantially equal force as that with which each of the other ring segments is urged, the valve plug 13 tends to remain substantially centered with respect to the bonnet portion 11. As a result, the force exerted between the liner 30 and the pressure seals disposed within the slot 33 and the slot formed by the step 34 and the wall 35 will be substantially equal about the periphery of the seals. Furthermore, the seals will be kept in proper orientation with respect to the valve plug 13 and the liner 30. This proper orientation of the pressure seals will help prevent steam from flowing past the seals. In this manner, not only is a better sealing action maintained, but valve plug vibration and damage caused by steam flowing past the pressure seals can be prevented.

The damper/isolator device discussed above also operates in a damping manner to dampen relative lateral movement between the valve plug 13 and the bonnet portion 11. This damping effect is largely due to the resiliency of the springs 44. Damping behavior depends on the mass of the ring segments 38, the mass of the valve plug 13, and the spring constants of the springs 44. Preferably, the damping behavior is controlled, by choosing the ring segment and valve plug masses and/or the spring constants, to effect maximum damping in the vibration frequency range corresponding to the range in which the valve experiences the greatest amount of adverse vibrations. For example, since steam flow across valve seats in nuclear control valves have induced vibration frequencies at values of K.85 Hz, where K=0, 1, 2 . . . , but with a large portion in the range of 300–400 Hz, the damping behavior of a damper/isolator device employed in a nuclear control valve may be selected to effect maximum damping in the 300–400 Hz range. The damper/isolator device is designed so that $w_n$ is not equal to w (for example, $w_n \geq 4w$), wherein w is the frequency of induced vibrations and $w_n$ is the natural frequency of the valve structure ($w_n$ can be determined by the formula $w_n = \sqrt{K/M}$, wherein K represents the spring constant of springs 44 and M represents the mass of the valve plug, the springs and the guide ring).

In this manner, the device operates to reduce or prevent the transmission of vibrations from the valve plug 13 to the bonnet liner 30 which will reduce the vibration experienced by the external and internal components of the valve. Reducing the vibration experienced by the external and internal components of the valve will thereby reduce a source of excessive noise generated by the valve system and prolong the life of the external and internal components. A significant reduction in noise can be achieved when the damper/isolator device is employed in a valve system which otherwise experiences vibrations in the audio frequency range, such as nuclear control valves.

Additionally, it is believed that the damper/isolator device described above prevents a vibration amplification problem experienced by past valve plug designs. It is believed that past valve plug systems have experienced a vibration amplification when the plug vibration frequency corresponds to the natural frequency of the plug, stem and liner system. The damper/isolator device described above, however, isolates the valve plug 13 from the bonnet liner 30 and thereby reduces or prevents a vibration amplification which would otherwise occur.

The damper/isolator device described above also provides additional friction damping of the valve plug (e.g., at the top, with respect to FIG. 1, of the valve plug 13). In this manner, the damper/isolator device operates to reduce overall valve plug and seal wear and damage.

The presently disclosed embodiments are to be considered in all respects as illustrative and not restrictive, the scope of the invention being indicated by the appended claims, rather than the foregoing description. All changes which come within the meaning and range of equivalency of the claims are intended to be embraced therein.

What is claimed:

1. In a control valve having a cylindrical housing and a cylindrical valve plug movable within the housing, the improvement comprising a vibration control device comprising:
   a movable abutting device composed of a plurality of ring segments spaced from one another about the circumference of the valve plug, extending from the valve plug, movable with respect to the valve plug, and abutting the housing; and
   a plurality of springs each disposed between an associated ring segment and the valve plug for urging the associated ring segment toward the housing.

2. A vibration control device as claimed in claim 1, wherein:
   the housing comprises a substantially hollow cylindrical member having an inside surface provided with a first diameter; and
   the valve plug comprises a substantially cylindrical member having an outside surface provided with a second diameter which is not greater than the first diameter.

3. A vibration control device as claimed in claim 1, wherein each ring segment is provided with a first surface facing the housing, the first surface having a plurality of indentations formed therein.

4. A vibration control device as claimed in claim 1, wherein:
   the ring segments each have a ring segment mass;
   the valve plug has a valve plug mass;
   the springs each have a spring constant;
   the vibration frequency at which the vibration control device provides a maximum damping effect is dependent on the ring segment masses, the valve plug mass and the spring constants; and
   at least one of the ring segment masses, the valve plug mass and the spring constants re chosen to effect maximum damping in the vibration frequency range of about 300 to about 400 Hz.

5. A vibration control device as claimed in claim 1, wherein each ring segment has at least three surfaces and wherein each said spring is a serpentine spring adapted to abut three surfaces of the associated ring segment.

6. A vibration control device as claimed in claim 5, wherein:
   the ring segments each have a ring segment mass;
   the valve plug has a valve plug mass;
   the springs each have a spring constant;
   the vibration frequency at which the vibration control device provides a maximum damping effect is dependent on the ring segment masses, the valve plug mass and the spring constants; and
   at least one of the ring segment masses, the valve plug mass and the spring constants is chosen to effect maximum damping in the vibration frequency range of about 300 to about 400 Hz.

7. A vibration control device as claimed in claim 1, wherein the valve plug comprises a substantially cylindrical wall, and wherein the vibration control device further comprises a ring segment retaining member secured with the substantially cylindrical wall of the valve plug, the ring segment retaining member having a plurality of channels corresponding in number with the plurality of ring segments, each said channel being configured to receive one of the ring segments therein.

8. A vibration control device as claimed in claim 7, wherein:
   the ring segment retaining member is provided with a plurality of slots corresponding in number with the plurality of channels, and each slot is associated with a respective channel and is located within the associated channel; and
   each said spring is associated with one of said slots and is located within the associated slot.

9. A vibration control device in a control valve of the type having a substantially hollow cylindrical housing, a valve lining provided on the inside surface of the housing, and a valve plug movable in the axial direction of and within the housing, the vibration control device comprising:
   a ring segment retaining member extending from the valve plug;
   a plurality of ring segments which extend from the ring segment retaining member toward the valve lining when the valve plug is disposed within the housing; and
   a plurality of springs each disposed between a respective ring segment and said ring segment retaining member for resiliently urging the ring segments toward the valve lining when the valve plug is disposed within the housing.

10. A vibration control device as claimed in claim 9, wherein each said spring is a serpentine spring arranged between the associated ring segment and the ring segment retaining member.

11. A vibration control device as claimed in claim 10, wherein:
   the ring segments each have a ring segment mass;
   the valve plug has a valve plug mass;
   each spring has a spring constant;
   the vibration frequency at which the vibration control device provides a maximum damping effect is dependent on the ring segment masses, the valve plug mass and the spring constants; and
   at least one of the ring segment masses, the valve plug mass and the spring constants is chosen to effect maximum damping in the vibration frequency range of about 300 to about 400 Hz.

12. A vibration control device as claimed in claim 9, wherein:
   the valve lining has an inside surface having an inside diameter;

the ring segment retaining member comprises a substantially cylindrical member having an outside diameter which is less than the inside diameter of the valve lining; and the plurality of ring segments are mutually spaced apart by a substantially equal distance and form a bifurcated ring about the ring segment retaining member.

13. A control valve comprising:

a substantially hollow cylindrical housing provided with an inside surface having an inside diameter;

a substantially cylindrical valve plug movable in the axial direction of, and within, the housing;

a substantially cylindrical ring segment retaining member extending from the valve plug, the ring segment retaining member provided with an outside surface having a diameter which is less than the inside diameter of the housing;

a plurality of ring segments, each of which extends from the outside surface of the ring segment retaining member toward the inside surface of the housing when the valve plug is disposed within the housing; and a plurality of springs, each spring being associated with one of the ring segments and being arranged between the associated ring segment and the ring segment retaining member;

wherein the springs are arranged to resiliently urge the ring segments away from the ring segment retaining member and toward the inside surface of the housing when the valve plug is disposed within the housing.

14. A control valve as claimed in claim 13, wherein the ring segment retaining member is provided with a set of slots, each slot being adapted for accommodating one of the springs, and a set of channels, each channel being adapted for accommodating one of the ring segments.

15. A control valve as claimed in claim 14, wherein each slot is arranged within a channel.

16. A control valve as claimed in claim 13, wherein the plurality of ring segments are mutually spaced apart by a substantially equal distance and form a bifurcated ring about the ring segment retaining member.

17. A control valve as claimed in claim 16, wherein the plurality of ring segments comprises four ring segments.

* * * * *